(12) United States Patent
Rössiger et al.

(10) Patent No.: US 9,732,396 B2
(45) Date of Patent: Aug. 15, 2017

(54) METHOD FOR OPERATING A CONTINUOUS ANNEALING LINE FOR THE PROCESSING OF A ROLLED GOOD

(75) Inventors: Martin Rössiger, Erlangen (DE); Günther Winter, Neunkirchen/Brand (DE)

(73) Assignee: PRIMETALS TECHNOLOGIES GERMANY GMBH, Erlangen (DE)

(*) Notice: Subject to any disclaimer, the term of this patent is extended or adjusted under 35 U.S.C. 154(b) by 469 days.

(21) Appl. No.: 14/238,565

(22) PCT Filed: Jul. 31, 2012

(86) PCT No.: PCT/EP2012/064959
§ 371 (c)(1),
(2), (4) Date: Feb. 12, 2014

(87) PCT Pub. No.: WO2013/023903
PCT Pub. Date: Feb. 21, 2013

(65) Prior Publication Data
US 2014/0175713 A1 Jun. 26, 2014

(30) Foreign Application Priority Data
Aug. 12, 2011 (EP) .................................. 11177403

(51) Int. Cl.
*C21D 9/00* (2006.01)
*C21D 8/04* (2006.01)
(Continued)

(52) U.S. Cl.
CPC ......... *C21D 9/0006* (2013.01); *C21D 8/0447* (2013.01); *C21D 9/56* (2013.01);
(Continued)

(58) Field of Classification Search
CPC .............................. C21D 9/0006; C21D 11/00
(Continued)

(56) References Cited

U.S. PATENT DOCUMENTS 5,770,838 A 6/1998 Rohrbaugh et al.
6,891,139 B2 5/2005 Iijima et al.
(Continued)

FOREIGN PATENT DOCUMENTS

CN 1549865 11/2004
CN 1720339 1/2006
(Continued)

OTHER PUBLICATIONS

Chinese Office Action for related Chinese Patent Application No. 2012800376413, issued Oct. 31, 2014, 15 pages.
(Continued)

*Primary Examiner* — Scott Kastler
(74) *Attorney, Agent, or Firm* — Staas & Halsey LLP

(57) ABSTRACT

A method operates a continuous annealing line for the processing of a rolled good, in particular a metal strip. A property of the rolled good in relation to a point or a section of the rolled good is fed to a computer-aided model as an input variable. The point or the section of the rolled good is located before or in the continuous annealing line. For the purpose of precise control of the continuous annealing process, at least one material property of the rolled good after the continuous annealing process is simulated by the computer-aided model and compared with a specified target value. If the simulated material property deviates from the target value, at least one process variable of the continuous annealing process is controlled as long as the point or the section of the rolled good is located before or in the continuous annealing line.

13 Claims, 1 Drawing Sheet

(51) Int. Cl.
*C21D 9/56* (2006.01)
*C21D 11/00* (2006.01)
*G05B 13/04* (2006.01)
*H05B 6/10* (2006.01)

(52) U.S. Cl.
CPC .............. *C21D 11/00* (2013.01); *G05B 13/04* (2013.01); *H05B 6/104* (2013.01); *C21D 8/0473* (2013.01); *Y02P 10/253* (2015.11)

(58) Field of Classification Search
USPC .......................................................... 266/44
See application file for complete search history.

(56) References Cited

U.S. PATENT DOCUMENTS

| | | | |
|---|---|---|---|
| 7,865,341 B2 | 1/2011 | Borchers et al. | |
| 8,046,090 B2* | 10/2011 | MacArthur | G05B 17/02 700/32 |
| 8,296,081 B2 | 10/2012 | Goto et al. | |
| 2006/0117549 A1 | 6/2006 | Plocoennik et al. | |
| 2006/0156773 A1* | 7/2006 | Kurz | B21B 37/74 72/8.5 |
| 2009/0320546 A1 | 12/2009 | Seidel et al. | |
| 2010/0269854 A1* | 10/2010 | Barbieri | C23G 3/02 134/3 |
| 2014/0175713 A1* | 6/2014 | Roessiger | C21D 8/0447 266/44 |

FOREIGN PATENT DOCUMENTS

| | | |
|---|---|---|
| CN | 1914567 | 2/2007 |
| CN | 101779114 | 7/2010 |
| EP | 1496129 | 1/2005 |
| EP | 1711868 | 5/2008 |
| EP | 2177892 | 4/2010 |
| EP | 2287345 | 2/2011 |
| EP | 11177403 | 8/2011 |
| JP | 7246407 | 9/1995 |
| WO | 2004/050923 | 6/2004 |
| WO | 2007/051521 | 5/2007 |
| WO | PCT/EP2012/064959 | 7/2012 |

OTHER PUBLICATIONS

European Office Action for European Priority Application No. 11177403.0, issued Feb. 10, 2012, 6 pages.

English Language International Search Report for PCT/EP2012/064959, mailed Nov. 5, 2012, 4 pages.

WIPO English Language Translation of Written Opinion for PCT/EP2012/064959, Downloaded from WIPO Website Feb. 12, 2014, 7 pages.

Berrenberg, Thomas, Dr., "Control of continuous strip annealing for copper and copper alloys by means of real-time recrystallisation modelling," *International Wrought Copper Council—Technical Seminar—2008*, 2008, pp. 1-18.

* cited by examiner

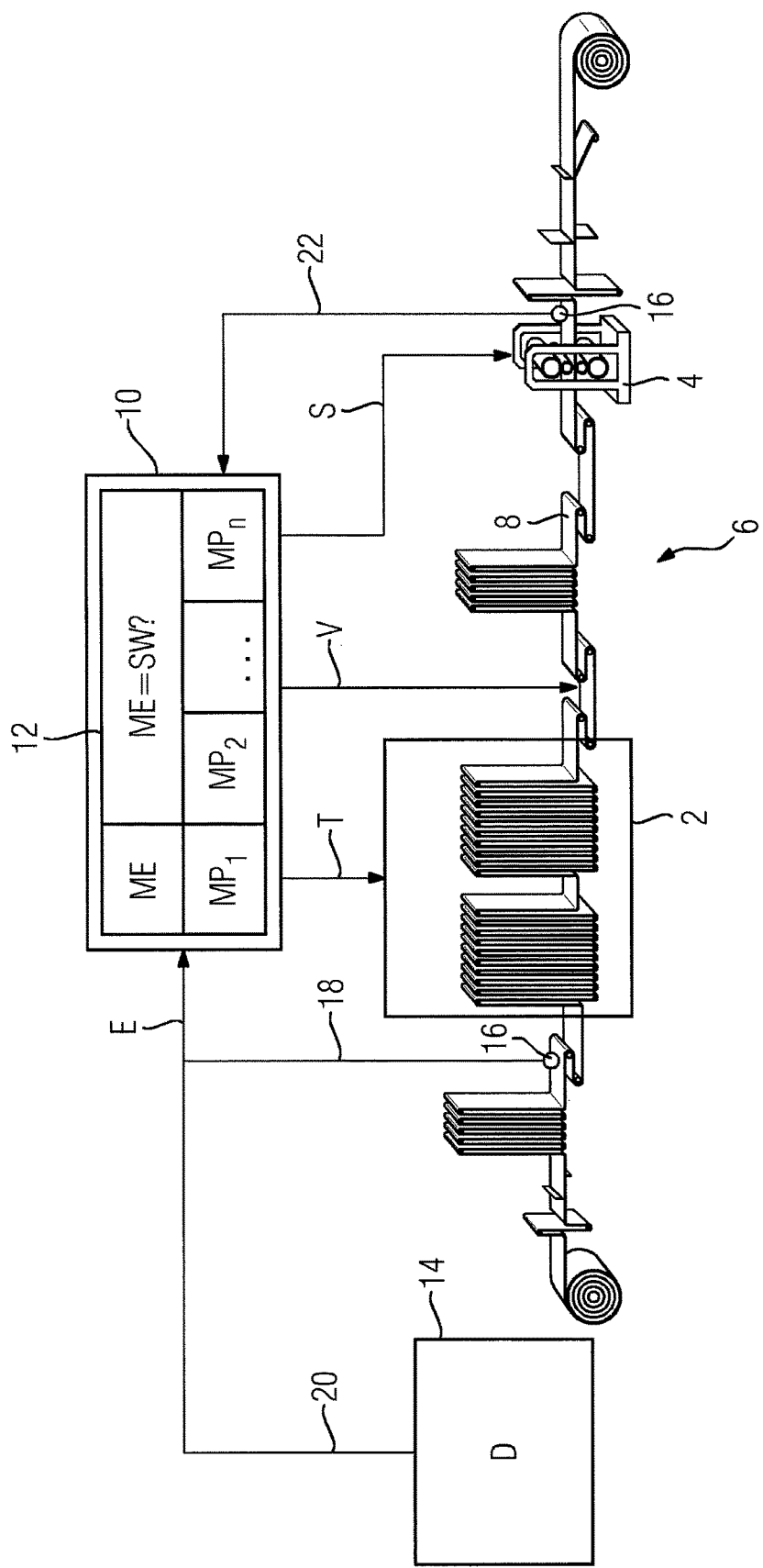

1

METHOD FOR OPERATING A CONTINUOUS ANNEALING LINE FOR THE PROCESSING OF A ROLLED GOOD

CROSS REFERENCE TO RELATED APPLICATIONS

This application is based on and hereby claims priority to International Application No. PCT/EP2012/064959 filed on Jul. 31, 2012 and European Application No. 11177403.0 filed on Aug. 12, 2011, the contents of which are hereby incorporated by reference.

BACKGROUND

The invention relates to a method for operating a continuous annealing line for the processing of a rolled good. The invention further relates to a control device for a continuous annealing line and a continuous annealing line.

After hot and cold rolling of a metallic strip, made of steel for example, the strip is subjected to heat treatment in order to set desired material properties in the strip. Industrially the heat treatment takes place for example in a continuous annealing line. In the continuous annealing line the strip is uncoiled and passes continuously through a furnace.

During the heat treatment in the continuous annealing line the aim, with a throughput which is as great as possible, is to refine the individual strips with quality which is as high and is as consistent as possible, both within one strip and also from strip to strip. The process parameters for the annealing process are set correspondingly for this purpose for each steel good. These are above all the strip speed and the temperature curve during annealing, i.e. the temperature of the individual heating and cooling sections within the annealing line. These process parameters are generally predetermined by the furnace manufacturer and/or by the operator and remain mostly unchanged for a steel good. When a new steel good is added, new process parameters are determined on the basis of empirical process data and experiments.

A method is known from EP 2 177 892 A1 in which, on the basis of measurement data of a steel sheet at a skin pass mill after a continuous annealing line, mechanical properties of the steel sheet are calculated and passed on to a user. The user can use the information about the calculated mechanical properties, by adapting the operating conditions of the steel production line for example. In such cases feedback control is undertaken, which only has an effect on new sections of the steel sheet.

SUMMARY

One possible object is to make possible a precise regulation of an annealing process.

The inventors propose a method for operating a continuous annealing line for the processing of a rolled good, especially a metallic strip, wherein in respect of a model-predictive regulation at least one property of the rolled good related to at least one point or at least one section of the rolled good is supplied as an input variable to a computer-aided model, wherein the at least one point or the at least one section of the rolled good is located before or in the continuous annealing line, with the aid of the computer-aided model at least one material property of the rolled good after the continuous annealing process is simulated,

2 the simulated material property is compared with a predetermined target value, and, if the simulated material property deviates from the target value, at least one process variable of the continuous annealing process is regulated for as long as the at least one point or the at least one section of the rolled good is before or in the continuous annealing line.

The proposal is based on the idea of providing a computer-aided model, which is suitable for a model-predictive regulation of the continuous annealing process, so that the regulation is undertaken on the basis of the simulated results for the material property. The computer-aided model models the material properties of the rolled good after the continuous annealing line. The model in such cases especially contains one or more model parameters that can be set. Such model parameters are e.g. the speed of the grain growth or a speed of the phase conversion of the metal strip.

Properties of the rolled good serve as input variables for the model, such as e.g. its alloy components or at least the steel group, its surface roughness, its thickness and/or its grain size before the continuous annealing line. The input variables can in such cases however relate to a number of points or sections of the strip, especially to the entire strip, e.g. if the input variable is the chemical composition of the steel or the steel group.

The model simulates the continuous annealing process and, in doing so, predicts the quality parameters of the rolled good after the continuous annealing line. The target value in such cases especially represents a quality standard or a desired quality. The target value can also be a range and not just an absolute value here. In a comparison of the simulated predicted material properties with predetermined target values for the available steel goods a difference can be produced under some circumstances which is to be minimized. In such cases the process parameters of the continuous annealing process, such as e.g. the strip speed in the furnace or also the temperature curve during the heat treatment, can be changed accordingly. There is thus a continuous regulation of the process parameters in real time, which leads to a desired quality of the rolled good.

In the proposed model-predictive regulation, regulation is thus not to the actual properties of the rolled good after the continuous annealing line, but a predicted result for the material properties is regulated with the aid of the computer-aided model. The results for the material properties of the rolled good after the heat treatment are thus already calculated if a point or section of the rolled good for which the input variables are determined is located before or even at the start of the continuous annealing process, or when the input variable relates to the entire rolled good, before a part of the rolled good has passed through the continuous annealing line. Thus an optimum control or regulation of the process parameters during the heat treatment in the continuous annealing line is possible, which leads to a precise control of the material properties to be set after the heat treatment.

In addition to the strip-specific input variables, at least one process variable of a prior process of the continuous annealing line is advantageously used as an input variable. Prior processes in this case are e.g. a hot rolling or a cold rolling of the rolled good. A coil temperature can be used in such cases as an input variable for example or the rolling forces in a pre-disposed production line. Here too the input variables can especially relate to the entire strip.

Likewise the process variables to be regulated, such as the temperature in the continuous annealing line for example, can be fed to the model as an input variable. The process variables to be regulated or other values to be correlated herewith are especially to be measured in such cases.

The at least one input variable can be measured or can be extracted from measurement or simulation data of the prior process. In accordance with a preferred variant the input variable is measured in particular immediately before the continuous annealing line. Preferably the input variable is determined by a measurement of the magnetic remanence or the surface roughness of the rolled good. Accordingly a facility for determining the magnetic remanence or the surface roughness is provided before the continuous annealing line. The advantage of these measurements is that they are free of disturbances and that they can be carried out on the moving strip. The magnetic remanence represents the residual magnetism which the previously magnetized rolled good contains after removal of the magnetic field. The magnetic remanence of the rolled good is correlated with material properties of the rolled good, so that via the magnetic remanence, a grain or particle size of the metal structure of the rolled good in particular is determined, which is supplied to the model as an input variable.

As an alternative or in addition to direct or indirect measurement of properties of the rolled good, which are used as input variables, the input variable, regardless of whether it is a strip-specific or process-specific variable, is determined in accordance with a further preferred variant from process data of the prior process. In the prior process, e.g. during cold rolling, under some circumstances models for calculating specific rolled good properties or for regulating process parameters are likewise applied. Information about the input variables for the model-predictive regulation of the continuous annealing line is obtained from the process data of these models.

With both the measured and also the calculated input variables it can occur that these cannot be determined exactly, wherein however a range is determined in which they move (e.g. as a type of frequency distribution). When only one range is determined for the input variables, advantageously the at least one process variable is regulated, starting from the most unfavorable value in the range. The regulation is then undertaken such that as large a range as possible of the possible input variable fluctuations is covered, i.e. modeling is especially over the entire range of the input variable, in order to determine the most unfavorable value in this range, and ultimately regulation is with this value. For example a Pearlite lamellae spacing is used as an input variable. It is true to say that the smaller the lamellae spacing the less is the required annealing time for austentization of the steel. If the lamellae spacing cannot be determined exactly but is able to be established within a fluctuation range however, in accordance with the proposed model-predictive regulation, in such cases starting from the most unfavorable possible Pearlite lamellae spacing within the fluctuation range, the annealing time to austentization is predicted.

In accordance with a preferred embodiment the model comprises one or more model parameters and the simulated material property after the continuous annealing process is measured, and if the simulated material property deviates from the measured material property, at least one model parameter is adapted. If e.g., after the continuous annealing process, a smaller grain size than simulated is established, the speed of the grain growth can be reduced accordingly in the model.

Expediently a surface roughness, a yield strength and/or a tensile strength of the rolled good is calculated with the aid of the calculation module as a material property. There are defined quality standards as a rule for these material properties, which are included in the simulation as a target value.

Preferably an intermediate variable is calculated by the model in respect of an indirect determination of the material property, wherein the intermediate variable is correlated with the material property. For example the intermediate variable is the grain size of the rolled good after the continuous annealing process. This grain size is simulated in the model and, on the basis of the grain size, the desired material properties, such as e.g. yield strength or tensile strength, are determined.

The inventors also propose a computer program comprising a machine code which is able to be processed by a control device for a rolling mill and the processing of which by the control device causes the control device to execute a method in accordance with the description given above. The computer program is preferably stored on a data medium in machine-readable form.

The inventors further propose a control device which is embodied such that, when operating, it executes a method in accordance with the description given above.

Finally the inventors propose a continuous annealing line which is controlled by such a control device.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The single FIGURE shows a schematic and greatly simplified diagram of a method for operating a continuous annealing line 2 which, together with a skin pass mill 4, is part of a processing line 6.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The advantages and preferred embodiments described in conjunction with the method can be transferred analogously to the computer program, the control device and the continuous annealing line.

An exemplary embodiment is explained in greater detail with reference to a drawing. In this drawing the single FIGURE shows a schematic and greatly simplified diagram of a method for operating a continuous annealing line 2 which, together with a skin pass mill 4, is part of a processing line 6. In the processing line 6 a rolled good, here a strip 8 of steel, is subjected to heat treatment. The continuous annealing line 2 and also the skin pass mill 4 are regulated in this case with the aid of a control device 10 which includes a model 12.

On entry of a specific point or section of the strip 8 into the continuous annealing line 2 input variables E related to this point or section of the strip are supplied to the model 12. The input variable E is especially a material property of the strip such as e.g. chemical composition, the surface roughness or the grain size of the strip 8. The input variable can relate to a point, to a section of the strip or alternatively to the entire strip. As a minimum requirement at least the steel quality of the strip 8 should form the input variable E.

In the exemplary embodiment shown the tensile strength and/or yield strength of the strip 8 is used as input variable E, which is determined indirectly via the magnetic remanence of the strip 8. The magnetic remanence is measured with the aid of the measurement facility 16, which is disposed immediately before the continuous annealing line 2. A measurement signal 18 is supplied to the control device 10 and the measurement signal 18 is processed in the control device, so that the desired input variable E is determined. The surface roughness of the strip 8 can also be measured directly and non-destructively as input variable E.

The grain size of the strip 8 and also other input variables such as e.g. a Pearlite lamellae spacing, can likewise be obtained from process data of a prior process 14, which is indicated in the FIGURE by an arrow 20. Not only strip-specific data can be included from the prior process 14 for the model 12, but likewise process-specific data such as e.g. the rolling forces of an upstream rolling stand or the individual strips thicknesses in the different stages of the strip processing. The prior process in the exemplary embodiment shown is a cold rolling process. During cold rolling models for simulating the process can likewise be used which contain data D which can be used directly or indirectly as input variables E for the model 12.

In addition to the strip-specific input variables E, process-specific variables of the continuous annealing line 2, such as the temperature of an inert gas in the furnace of the continuous annealing line 2 for example, can form further input variables for the model 12.

In the exemplary embodiment shown the input variables E are obtained both through measurements and also through the process data from the prior process 14. It is however also conceivable to only determine the input variables E through one of these two procedures.

On the basis of the input variables E a material property ME of the strip 8 after the continuous annealing line 2 is simulated in model 12. The material property ME is e.g. a yield strength or a tensile strength of the strip 8 after the skin pass mill 4. The material property ME after the annealing is thus predicted even at the beginning or during the heat treatment in the continuous annealing line 2. The simulated material property ME is compared with a predetermined target value SW, in order to check whether the material property ME satisfies the quality requirements. Should the simulated material property ME deviate from the target value SW, at least one process variable of the processing line 6 or of the continuous annealing line 2 is controlled or regulated. Such process variables are e.g. the strip speed V in the continuous annealing line 2 or in the remaining areas of the processing line 6 as well as the temperature curve T in the continuous annealing line 2, wherein temperature curve T is to be understood as both the spatial and also the temporal temperature curve. A change of process parameters of the skin pass mill 4 is illustrated in the FIGURE by a control signal S.

If an input variable E cannot be determined precisely, but only a range is known in which the input variable E lies, the simulation is carried out with the aid of the model 12, especially for all and at least for both limits of the range. For the heat treatment in the continuous annealing line 2, the simulation with the most unfavorable value of the range for the input variable E is included and accordingly at least one process parameter T, V, S is set.

The model 12 comprises a series of model parameters MP1, MP2, . . . , MPn, on the basis of which the simulation of the material property ME is carried out after the heat treatment. Model parameters MP are e.g. the speed of the grain growth during the heat treatment or a correction factor for the speed of the phase conversion.

The model parameters MP are able to be set in the exemplary embodiment shown and are adapted as a function of an actual, measured material property. For example a measurement facility 16 for determining the magnetic remanence is likewise provided directly after the skin pass mill 4. A measuring signal 20 is supplied to the control device 10. On the basis of the measuring signal 20, the actual yield strength and/or tensile strength of the strip 8 in the area of the skin pass mill 4 is determined in the control device 10 indirectly. The yield strength thus measured indirectly is compared with the yield strength which was simulated when this strip section was located at the start of the continuous annealing line. If the simulated yield strength deviates from the measured yield strength one or more model parameters MP are adapted in order to increase the precision in the model-predictive regulation of the heat treatment of the steel strip 8.

Thanks to the model-predictive regulation of the continuous annealing line 2 described above, there is a continuous real-time adaptation of the current process parameters T, V, S to the strip-specific input parameters E, through which a more precise control of the material properties (e.g. yield strength, tensile strength) can be achieved both within the strip and also from strip to strip. As an alternative or in addition to regulation based on quality parameters, the throughput through the processing line at 6 can be increased by the model and thus the energy consumption can be reduced.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for operating a continuous annealing line for processing a rolled steel strip, comprising:
   using a measuring device to measure a property of the rolled steel strip,
   supplying the property of the rolled steel strip as an input variable to a computer-aided model of a control device, the property of the rolled steel strip being possessed by a section of the rolled steel strip located upstream from or in the continuous annealing line,
   using the computer-aided model and the property of the rolled steel strip to predict a material property of the rolled steel strip after the continuous annealing line and to produce a predicted material property,
   comparing the predicted material property with a predetermined target value,
   annealing the rolled steel strip with the continuous annealing line, and
   if the predicted material property deviates from the target value, altering a process variable of the continuous annealing line while the section of the rolled steel strip is located upstream of or in the continuous annealing line, wherein
   the computer-aided model performs model-predictive regulation of the continuous annealing line using a model parameter, the material property that is predicted is measured after the continuous annealing line to produce a measured material property, and if the predicted material property deviates from the measured material property, the model parameter is adapted.

2. The method as claimed in claim 1, wherein at least one process variable of a prior process of the continuous annealing line is additionally used as an input variable.

3. The method as claimed in claim 1, wherein for the input variable, the property of the rolled steel strip is measured upstream from the continuous annealing line.

4. The method as claimed in claim 3, wherein for the input variable, the property of the rolled steel strip is determined by a measurement of a magnetic remanence of the rolled steel strip.

5. The method as claimed in claim 1, wherein for the input variable, the property of the rolled steel strip is determined from process data of a prior process on the rolled steel strip, upstream from the continuous annealing line.

6. The method as claimed in claim 1, wherein for the input variable, a range for the property of the rolled steel strip is determined, and the process variable is altered based on a most unfavorable value in the range.

7. The method as claimed in claim 1, wherein the material property of the rolled steel strip is at least one property selected from the group consisting of surface roughness, yield strength and tensile strength.

8. The method as claimed in claim 1, wherein the computer-aided model calculates an intermediate variable of the rolled steel strip, and for the input variable, the property of the rolled steel strip is correlated with the intermediate variable.

9. The method as claimed in claim 1, wherein the model parameter includes at least one of a speed of a grain growth of the rolled steel strip and a speed of a phase conversion of the rolled steel strip.

10. The method as claimed in claim 1, wherein a plurality of properties of the rolled steel strip are supplied as input variables to the computer-aided model.

11. A non-transitory computer readable storage medium storing a program, which when executed by a control device, causes the control device to perform a method for controlling a continuous annealing line for processing a rolled steel strip, the method comprising:

using a measuring device to measure a property of the rolled steel strip, receiving the property of the rolled steel strip as an input variable to a computer-aided model of the control device, the property of the rolled steel strip being possessed by a section of the rolled steel strip located upstream from or in the continuous annealing line, using the computer-aided model and the property of the rolled steel strip to predict a material property of the rolled steel strip after the continuous annealing line and to produce a predicted material property, comparing the predicted material property with a predetermined target value, annealing the rolled steel strip with the continuous annealing line, and if the predicted material property deviates from the target value, altering a process variable of the continuous annealing line while the section of the rolled steel strip is located upstream of or in the continuous annealing line, wherein the computer-aided model performs model-predictive regulation of the continuous annealing line using a model parameter, the material property that is predicted is measured after the continuous annealing line to produce a measured material property, and if the predicted material property deviates from the measured material property, the model parameter is adapted.

12. A control device for a continuous annealing line, comprising:

at least one processor to receive a property of the rolled steel strip measured by a measuring device, the property of the measuring device being used as an input variable to a computer-aided model of the control device, the property of the rolled steel strip being possessed by a section of the rolled steel strip located upstream from or in a furnace of the continuous annealing line, use the computer-aided model and the property of the rolled steel strip to predict a material property of the rolled steel strip after the furnace and to produce a predicted material property, compare the predicted material property with a predetermined target value, and alter a process variable of the furnace while the section of the rolled steel strip is located upstream of or in the furnace if the predicted material property deviates from the target value, wherein the computer-aided model performs model-predictive regulation of the continuous annealing line using a model parameter, the material property that is predicted is measured after the continuous annealing line to produce a measured material property, and if the predicted material property deviates from the measured material property, the model parameter is adapted.

13. A continuous annealing line comprising:

a furnace to heat a rolled steel strip as the roiled steel strip is passed through the furnace; and a control device as claimed in claim 12.

* * * * *

UNITED STATES PATENT AND TRADEMARK OFFICE
CERTIFICATE OF CORRECTION

PATENT NO. : 9,732,396 B2  
APPLICATION NO. : 14/238565  
DATED : August 15, 2017  
INVENTOR(S) : Martin Roessiger et al.

Page 1 of 1

It is certified that error appears in the above-identified patent and that said Letters Patent is hereby corrected as shown below:

In the Claims

Column 8, Line 53:
In Claim 13, delete "roiled" and insert -- rolled --, therefore.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*